United States Patent
Ping et al.

(10) Patent No.: US 7,128,141 B2
(45) Date of Patent: Oct. 31, 2006

(54) COMBINATION HVAC AND AUXILIARY ENGINE COOLING

(75) Inventors: Keith D. Ping, Danville, KY (US); Richard V. LaHue, Danville, KY (US); Aaron C. Stull, Oak Creek, WI (US); Joseph M. Withers, Frankfort, KY (US); Gregg D. Olson, Racine, WI (US)

(73) Assignee: Modine Manufacturing Company, Racine, WI (US)

( * ) Notice: Subject to any disclaimer, the term of this patent is extended or adjusted under 35 U.S.C. 154(b) by 367 days.

(21) Appl. No.: 10/776,130

(22) Filed: Feb. 11, 2004

(65) Prior Publication Data

US 2005/0173106 A1    Aug. 11, 2005

(51) Int. Cl.
*B60H 1/00* (2006.01)
*B60H 3/00* (2006.01)

(52) U.S. Cl. ............................ 165/202; 165/43; 454/75
(58) Field of Classification Search .............. 165/202, 165/203, 204, 42, 43, 44; 454/69, 75, 121
See application file for complete search history.

(56) References Cited

U.S. PATENT DOCUMENTS

| | | | |
|---|---|---|---|
| 2,867,996 A | 1/1959 | Bullard | |
| 3,203,476 A | 8/1965 | McMahan | |
| 3,859,817 A | 1/1975 | Kick | |
| 4,289,195 A * | 9/1981 | Bellot et al. ................ | 165/204 |
| 4,516,406 A | 5/1985 | Gentry et al. | |
| 4,683,725 A | 8/1987 | Sugiura | |
| 4,802,405 A * | 2/1989 | Ichitani et al. ................ | 454/75 |
| 5,172,656 A | 12/1992 | Wright | |
| 5,699,960 A * | 12/1997 | Kato et al. ..................... | 454/75 |
| 5,857,905 A * | 1/1999 | Uemura et al. ............. | 454/121 |
| 6,135,201 A * | 10/2000 | Nonoyama et al. ......... | 165/202 |
| 6,173,578 B1 | 1/2001 | Al-Otaibi | |

FOREIGN PATENT DOCUMENTS

| | | |
|---|---|---|
| DE | 28 37 759 A1 | 3/1980 |
| DE | 199 53 223 A1 | 5/2001 |
| FR | 2 524 060 | 9/1983 |

* cited by examiner

*Primary Examiner*—Ljiljana Ciric
(74) *Attorney, Agent, or Firm*—Wood, Phillips, Katz, Clark & Mortimer

(57) ABSTRACT

A vehicle heat transfer module including a conduit for air circulation, an evaporator in the conduit between the cabin air input and cabin air output, and a heater having vehicle engine coolant circulated therethrough, the heater being in a first path between the evaporator and the cabin air output. A first door selectively opens or closes the fresh air input and fresh air output, and a second door blocks a selected amount of cabin air from the first path. A controller controls the first and second doors responsive to heating and cooling requirements. Cabin and fresh air is selectively circulated over the heater and evaporator responsive to detected requirements, including selectively either (a) circulating cabin air from the cabin air input over the evaporator and out the cabin air output, and circulating fresh air from the fresh air input over the heater and out the fresh air output, or (b) blocking the fresh air input and fresh air output and passing cabin air from the cabin air input over one or both of the evaporator and the heater and out the cabin air output.

9 Claims, 2 Drawing Sheets

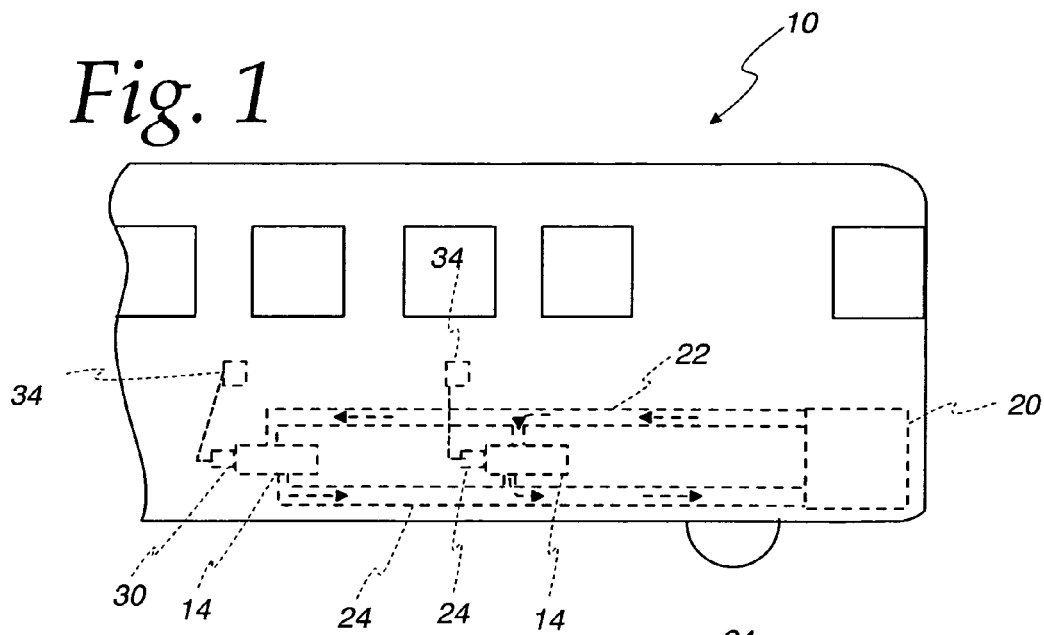
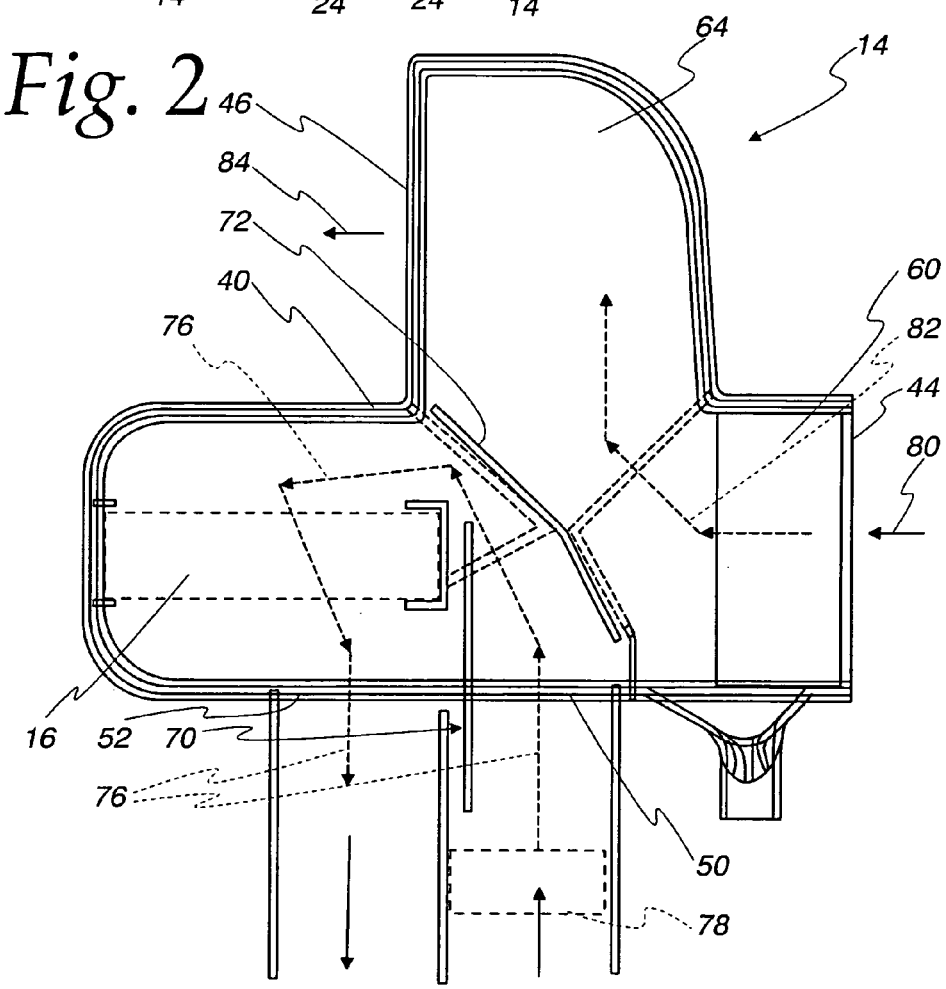

COMBINATION HVAC AND AUXILIARY ENGINE COOLING

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention is directed toward heat exchangers, and particularly toward vehicle heat exchangers.

BACKGROUND OF THE INVENTION AND TECHNICAL PROBLEMS POSED BY THE PRIOR ART

Control of cabin air in vehicles for the comfort of the cabin occupants is an important component of any vehicle, not only in enhancing enjoyment of riding in the vehicle but also in making the vehicle a desirable choice among potential purchasers of such vehicles. Reliability of the vehicle in transporting occupants, as well as fuel efficiency, is also clearly important to potential vehicle purchasers, as well as vehicle cost. This may be particularly important, for example, to bus companies, which depend upon cost efficiency as well as customer satisfaction and repeat business for their economic viability. Uncomfortable passengers are unlikely to be repeat customers, as are passengers who are stranded due to a breakdown of the vehicle.

The present invention is directed toward providing vehicles in which the above important factors are enhanced.

SUMMARY OF THE INVENTION

In one aspect of the present invention, a vehicle heat transfer module is provided, including a conduit for air circulation including an input and output for vehicle cabin air and an input and output for fresh air, an evaporator in the conduit between the cabin air input and cabin air output, and a heater having vehicle engine coolant circulated therethrough, with the heater being in a first path in the conduit between the cabin air input and the cabin air output and in a second path in the conduit between the fresh air input and the fresh air output. A first door is adapted to selectively open or close the fresh air input and fresh air output, and a second door is adapted to block a selected amount of cabin air from the heater. A controller is adapted to control the first and second doors responsive to heating and cooling requirements.

In one form of this aspect of the present invention, the controller controls the first door to close the fresh air input and fresh air output when controlling the second door to block less than all of the cabin air from the heater.

In another form of this aspect of the present invention, the evaporator is disposed over the cabin air input.

In another form of this aspect of the present invention, the controller controls the first door to open the fresh air input and fresh air output when controlling the second door to block all of the cabin air from the heater.

In still another form of this aspect of the present invention, a detector which is operably connected to the controller detects the heating and cooling requirements for the vehicle cabin.

In yet another form of this aspect of the present invention, a blower is adapted to selectively blow air from the conduit out the cabin air output.

In a further form of this aspect of the present invention, a secondary blower is adapted to selectively blow air in a path from said fresh air input to said fresh air output.

In a still further form of this aspect of the present invention, the conduit defines a third path between the cabin air input and the cabin air output, the third path not including the first path. The evaporator is in the third path, and the second door is controllably moveable between a first position blocking the first path from the third path and at least one second position in which a selected amount of cabin air in the third path is diverted to the second path. In a further advantageous form, there are a plurality of second positions, each diverting a different selected amount of cabin air in the third path to the second path, and the second door is pivotable between the first position and the second positions.

In another aspect of the present invention, a method of controlling cabin and engine temperatures of a vehicle is provided, including the steps of (1) providing a heater and evaporator in a unit, the heater having vehicle engine coolant circulated therethrough and the unit having an input and output for cabin air and an input and output for fresh air, and (2) selectively circulating cabin air and fresh air over the heater and evaporator, including selectively either (a) circulating cabin air from the cabin air input over the evaporator and out the cabin air output, and circulating fresh air from the fresh air input over the heater and out the fresh air output, or (b) blocking the fresh air input and fresh air output and passing cabin air from the cabin air input over at least one of the evaporator and the heater and out the cabin air output.

In one form of this aspect of the present invention, only a selected portion of the cabin air is passed over the heater when the fresh air input is blocked. In a further form, the selected portion of the cabin air passed over the heater is based on the heating and cooling requirements detected in the vehicle cabin.

In another form of this aspect of the present invention, heating and cooling requirements are detected, and the selectively circulating cabin air and fresh air step is responsive to detected heating and cooling requirements in the vehicle cabin.

In yet another form of this aspect of the present invention, fresh air is circulated over the heater and cabin air is circulated over the evaporator when a maximum cooling requirement is detected for at least one of the cabin and engine temperatures.

In still another form of this aspect of the present invention, the heating and cooling requirements are detected in the vehicle cabin.

BRIEF DESCRIPTION OF THE DRAWINGS

FIG. 1 is a schematic view of a vehicle including a heat transfer system according to the present invention;

FIG. 2 is a cross-sectional view of a heat transfer module according to the present invention, showing the module in a position for maximum cabin cooling.

DETAILED DESCRIPTION OF THE INVENTION

Figure 3:
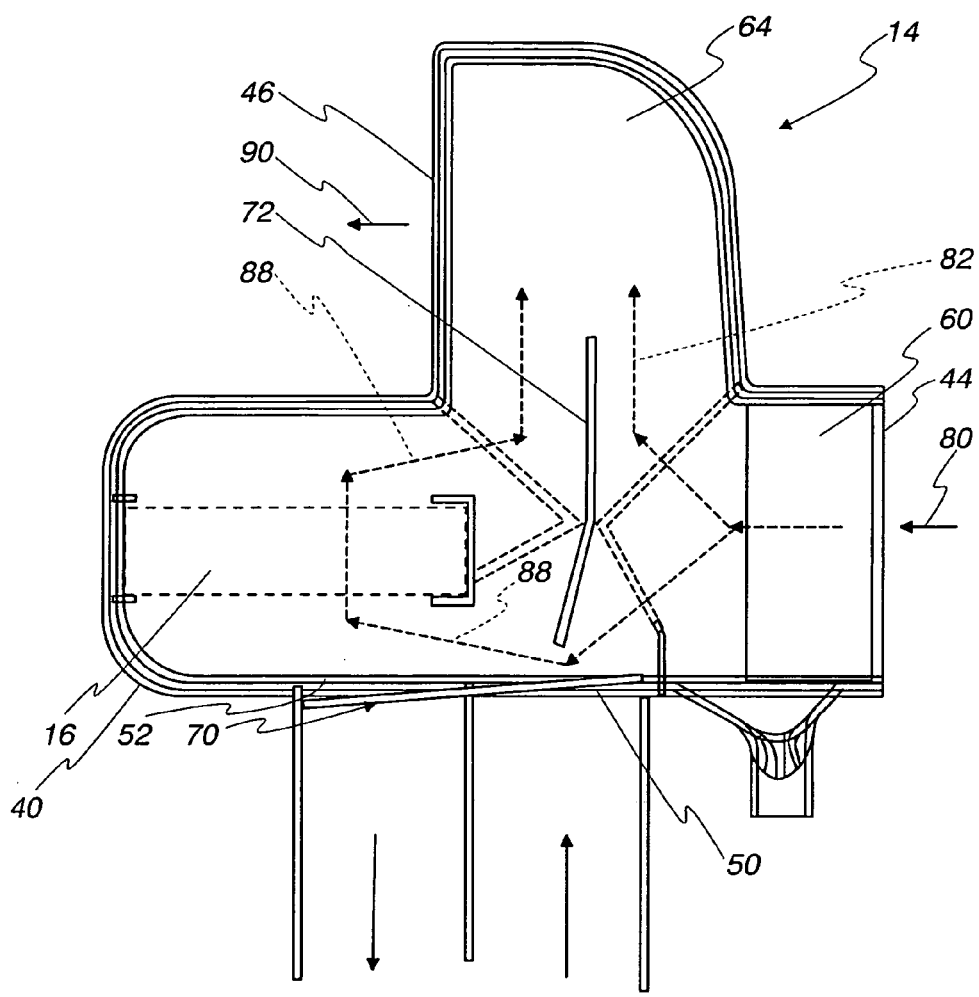
FIG. 3 is a view similar to FIG. 2, showing the module in a position providing heating to the vehicle cabin.

A vehicle 10, such as a bus, is shown in FIG. 1 with a pair of heat transfer modules 14 according to the present invention. The modules 14 are shown in general schematic form in FIG. 1, and are shown in greater detail in FIGS. 2–3.

In the illustrated embodiment, the modules 14 include a heat exchanger such as a radiator/heater 16 (see FIGS. 2–3). Engine coolant is circulated from the vehicle engine 20 via an output line 22 to the heaters 16 connected in parallel, and then back to the engine 20 via an input line 24.

Suitable controllers 30 are also provided with the heat transfer modules 14 for controlling operation as described below. Further, one or more detectors 34 may also be advantageously provided to detect the heating and cooling requirements for the vehicle cabin, with the detectors 34 being operably connected to the controllers 30. The detectors 34 may be, for example, thermostats which automatically detect thermal requirements, or manual switches operable by persons in the cabin to call for heating or cooling according to their personal desires, or a combination of the two.

As previously indicated, FIG. 1 is a general schematic illustration showing the various parts of the described embodiment, and the location, manner of connection, and other details are not intended to be limiting of the invention in any way. Once the invention as described herein is fully understood, it should be appreciated that many different configurations, parts and other details would be suitable and could be used consistently with the present invention.

One heat transfer module 14 consistent with the present invention is shown in FIGS. 2–3.

The module 14 includes a conduit housing 40 which includes an input 44 for vehicle cabin air, an output for 46 vehicle cabin air, an input 50 for fresh air, and an output 52 for fresh air.

The previously described heater 16, through which engine coolant circulates, is suitably supported in the conduit housing 40. A suitable evaporator 60 is suitably supported across the cabin air input 44, which evaporator 60 may function as a part of a suitable circuit (not shown) to provide selected cooling of cabin air when desired. A suitable HVAC blower 64 is provided between the evaporator 60 and the cabin air output 46.

The controller 30 controls a first door 70 which is suitably supported for movement (e.g., pivoting movement) between a position opening (FIG. 2) or closing (FIG. 3) the fresh air input 50 and output 52.

The controller 30 also controls a second door 72 movable (e.g., by pivoting) between a first position (FIG. 2) in which it substantially blocks passage of cabin air from the evaporator 60 to the heater 16, and at least one second position (FIG. 3) in which at least a portion of the cabin air may flow over the heater 16.

Specifically, as illustrated in FIG. 2, when the detector 34 associated with the module 14 indicates that cooling is desired in the vehicle cabin, the controller 30 suitably controls the first door 70 to an open position in which the fresh air input 50 and output 52 are unblocked. At the same time, the controller 30 suitably controls the second door 72 to substantially close off the cabin air from the fresh air, defining separated air flow paths through the conduit housing 40.

Thus, in the FIG. 2 configuration, fresh air (e.g., from outside the vehicle 10) may flow in a first path 76, into the conduit housing fresh air input 50, through the heater 16, and then out the conduit fresh air output 52. Such air flow may be achieved, for example, as a result of ram air flow caused by movement of the vehicle and suitable placement of input and output ducts in that air flow. A suitable secondary blower may also be provided to blow air into the input 50 or out the output 52 to assist in such air flow along the path 76. The secondary blower 78 illustrated in phantom in FIG. 2 blows air into the fresh air input 50 when desired. As a result of that air flow, supplemental cooling of engine coolant circulating through the heater 16 is achieved to advantageously assist in maintaining reliable operation of the engine 20.

Still other blowers could also be used to assist air flow paths within the scope of the present invention.

At the same time, in the FIG. 2 configuration, if cooling is desired in the cabin (as indicated by the detector 34), the blower 64 may be suitably activated by the controller 30 draw vehicle cabin air 80 into the conduit housing 40 through the evaporator 60, following a path 82 separate from the first path 76 until the air (cooled by the evaporator 60) is output at 84. It should be appreciated that it would be within the scope of the present invention for the evaporator 60 to be across the path 82 but spaced from the cabin air input 44.

As a result, both supplemental cooling of engine coolant and comfort cooling of cabin air for occupants of the cabin may be advantageously, simultaneously accomplished.

By contrast, as illustrated in FIG. 3, where the detector 34 indicates that heat is desired in the vehicle cabin, the controller 30 may move the first door 70 to a closed position in which the fresh air input 50 and output 52 are closed. At the same time, the controller 30 may suitably position the second door 72 so as to divert at least some of the input cabin air to an alternate path 88 passing through the heater 16 and then to the blower 64, with blended warm air (a blend of air which has been heated by the heater 16 with air which has not passed through the heater 16) thereby being output at 90 into the vehicle cabin. (It should be appreciated that, e.g., in cold weather where cooling of the cabin is not required, the evaporator 60 and its related circuit may not be operated, in which case essentially no significant heat exchange will occur as the cabin air passes over the evaporator 60).

As a result, both supplemental cooling of engine coolant and comfort warming of cabin air for occupants of the cabin may be advantageously, simultaneously accomplished.

It should be appreciated that the second door 72 may advantageously be suitably positioned in a virtually infinite variety of second positions, from a position in which only a small amount of cabin air is diverted to the alternate path 88 to a position in which essentially all of the cabin air coming in the cabin air input 44 is diverted to the alternate path 88, based on detected cabin heating requirements. Such operation may be facilitated by the suitable design of the housing 40 and doors 70, 72. For example, the bend of the second door 72 may be used to assist in defining the split of the air between paths 82, 88.

Further, it should be appreciated that detected heating requirements may be met by varying the speed at which the blower 64 in conjunction with the selected second position of the second door 72 (e.g., a higher blower speed may require that less air be diverted to the heater 16 via the alternate path 88 to achieve a desired heating).

Still further, it should be appreciated that when several of these modules 14 are used such as illustrated in FIG. 1, a particularly significant amount of auxiliary engine cooling may be achieved.

As a result, the present invention may be used to advantageously assist in the efficient provision of a comfortable cabin environment for occupants of the vehicle, while at the same time accomplishing desired auxiliary cooling of engine coolant, with the resultant advantages of vehicle reliability and engine longevity.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

The invention claimed is:

1. A vehicle heat transfer module, comprising:
   a conduit for air circulation, said conduit including an input and output for vehicle cabin air and an input and output for fresh air;
   a first door disposed to selectively open or close said fresh air input and fresh air output;
   a second door disposed to block a selected amount of cabin air from a heater;
   a controller configured to control said first and second doors responsive to heating and cooling requirements such that
     in a first condition
       said first door opens said fresh air input and output for flow of fresh air in a first path between said fresh air input and said fresh air output, and
       said second door substantially separates said first path from a second path in said conduit between said cabin air input and said cabin air output, and
     in other conditions
       said first door closes said fresh air input and said fresh air output, and
       said second door directs selected amounts of said cabin air from said path to an alternate path;
   an evaporator in said second path; and
   said heater having vehicle engine coolant circulated therethrough, said heater being in said first path and said alternate path.

2. The heat transfer module of claim 1, wherein said evaporator is disposed over said cabin air input.

3. The heat transfer module of claim 1, whereby said controller controls said first door to close said fresh air input and fresh air output when controlling said second door to block less than all of said cabin air from said heater.

4. The heat transfer module of claim 1, whereby said controller controls said first door to open said fresh air input and fresh air output when controlling said second door to block all of said cabin air from said heater.

5. The heat transfer module of claim 1, further comprising a detector detecting said heating and cooling requirements for the vehicle cabin, said detector being operably connected to said controller.

6. The heat transfer module of claim 1, further comprising a blower adapted to selectively blow air from said conduit out said cabin air output.

7. The heat transfer module of claim 1, further comprising a secondary blower adapted to selectively blow air in said first path from said fresh air input to said fresh air output.

8. A vehicle heat transfer module, comprising:
   a conduit for air circulation, said conduit including an input and output for vehicle cabin air and an input and output for fresh air;
   an evaporator in said conduit between said cabin air input and cabin air output;
   a heater having vehicle engine coolant circulated therethrough, said heater being in a first path between said fresh air input and said fresh air output and in a second path between said cabin air input and said cabin air output;
   a first door disposed to selectively open or close said fresh air input and fresh air output;
   a second door disposed to block a selected amount of cabin air from said heater; and
   a controller configured to control said first and second doors responsive to heating and cooling requirements, wherein
     said conduit defines a third path between said cabin air input and said cabin air output, wherein said evaporator is in said third path and said third path does not include said first path, and
     said second door is controllably moveable between a first position blocking said first path from said third path and a plurality of other positions in which selected amounts of cabin air in said third path are diverted to said second path.

9. The heat transfer module of claim 8, wherein said other positions of said second door each divert a different selected amount of cabin air in the third path to said second path, and said second door is pivotable between said first position and said second positions.

* * * * *

UNITED STATES PATENT AND TRADEMARK OFFICE
CERTIFICATE OF CORRECTION

PATENT NO. : 7,128,141 B2 Page 1 of 1
APPLICATION NO. : 10/776130
DATED : October 31, 2006
INVENTOR(S) : Keith D. Ping et al.

It is certified that error appears in the above-identified patent and that said Letters Patent is hereby corrected as shown below:

Column 5, line 35, after "said" insert --second--.

Signed and Sealed this

First Day of May, 2007

JON W. DUDAS
*Director of the United States Patent and Trademark Office*